United States Patent [19]

Cremona

[11] 4,069,850

[45] Jan. 24, 1978

[54] TOOL FEEDING DEVICE FOR USE IN A WORK FORMING MACHINE

[76] Inventor: Angelo Cremona, V. le Lombardia, 275, Monza, Italy, 20052

[21] Appl. No.: 686,839

[22] Filed: May 17, 1976

[30] Foreign Application Priority Data

June 26, 1975 Italy .................................. 24799/75

[51] Int. Cl.² ................................................ B27L 5/06

[52] U.S. Cl. .................................. 144/178; 74/89.15; 144/162 R; 144/214

[58] Field of Search ........... 144/211, 212, 213, 209 R, 144/177, 178, 179, 162 R; 74/22 R, 23, 24, 22 A, 423, 89.15, 424.8; 83/62, 556, 558, 700, 915.5

[56] References Cited

U.S. PATENT DOCUMENTS

| | | | |
|---|---|---|---|
| 2,676,627 | 4/1954 | McFall | 144/178 |
| 3,654,973 | 4/1972 | Koss | 144/178 |

FOREIGN PATENT DOCUMENTS

| | | | |
|---|---|---|---|
| 990,039 | 5/1951 | France | 144/134 R |
| 993,906 | 8/1951 | France | 144/134 R |

*Primary Examiner*—Othell M. Simpson
*Assistant Examiner*—W. D. Bray
*Attorney, Agent, or Firm*—McGlew and Tuttle

[57] ABSTRACT

A device to rapidly move away and subsequently move closer to the wood stock the blade-holding unit and bar-carrying unit, after each cutting operation, in a vertical type wood shearing machine, comprising and characterized by one or more pairs of screws, which when rotating determine the axial feeding motion of the assembly, as well as an equal number of hydraulic double-acting cylinders provided at the rear ends of the screws and connected thereto, which determine by the axial displacement of the respective pistons the actual quick movement away and movement closer of the assembly with respect to the wood stock to be cut.

12 Claims, 3 Drawing Figures

9

5''

G

5

8

TOOL FEEDING DEVICE FOR USE IN A WORK FORMING MACHINE

BACKGROUND OF THE INVENTION

In vertical type wood shearing machines, the blade-holding unit and the bar-carrying unit are provided, in the production step, with a feeding motion towards the wood stock, having an extent equal to the thickness of the sheet cut.

During such feeding motion, in order to avoid that the wood stock, which is also moving, interferes with the blade, it is necessary to provide also suitable means to rapidly move away and subseqently move closer to the wood stock itself.

In the machines known heretofore in the art, said means to disengage the blade from the wood stock —which intervene during the return stroke of said wood stock —consist of a types of motions which allows for rotation, successively in both directions, of the blade-holding unit and the bar-carrying unit about an axis which is located above the supporting slides and is parallel to the blade.- As a result there is a lack of total rigidity between the side slides of the wood shearing machine and the blade-holding unit and bar-carrying unit in the cutting step,, during which said members have to be kept stationary.

SUMMARY OF THE INVENTION

In order to avoid said drawback it has been thought to provide suitable means capable of allowing a motion to quickly move the blade-holding unit and bar-carrying unit away from or closer to the wood stock, in a straight line or lenear motion, (instead of angularly), in addition to the actual feeding motion by keeping the assembly comprising the blade-holding beam and the bar-carrying beam coincidental with the shoulders of the unit.

The object of the present invention comprises essentially two screws, per se known, connecting the blade-holding unit and bar-carrying unit to two rear reaction boxes, integral with the bed of the wood shearing machine, and adapted to determine the feeding motion of the unit, as well as an equal number of piston and cylinder assemblees provided at the rear ends of the screws themselves.

The screws are mechanically connected with each other so as to act simultaneously, driven by any suitable means; and they are originally provided, as mentioned above, at one of their ends with a double-acting hydraulic cylinder adapted to repidly move them axially.- The movement of each screw will be adjusted so that it corresponds to an amount equal to little more than the thickness of the sheet to be cut.

The accompanying drawings, given by way of example only and without limitation, show a preferred embodiment of the device according to the invention.-

THE VIEWS OF THE DRAWINGS

DETAILED DESCRIPTION OF THE PREFERRED EMBODIMENT

Figure 1:
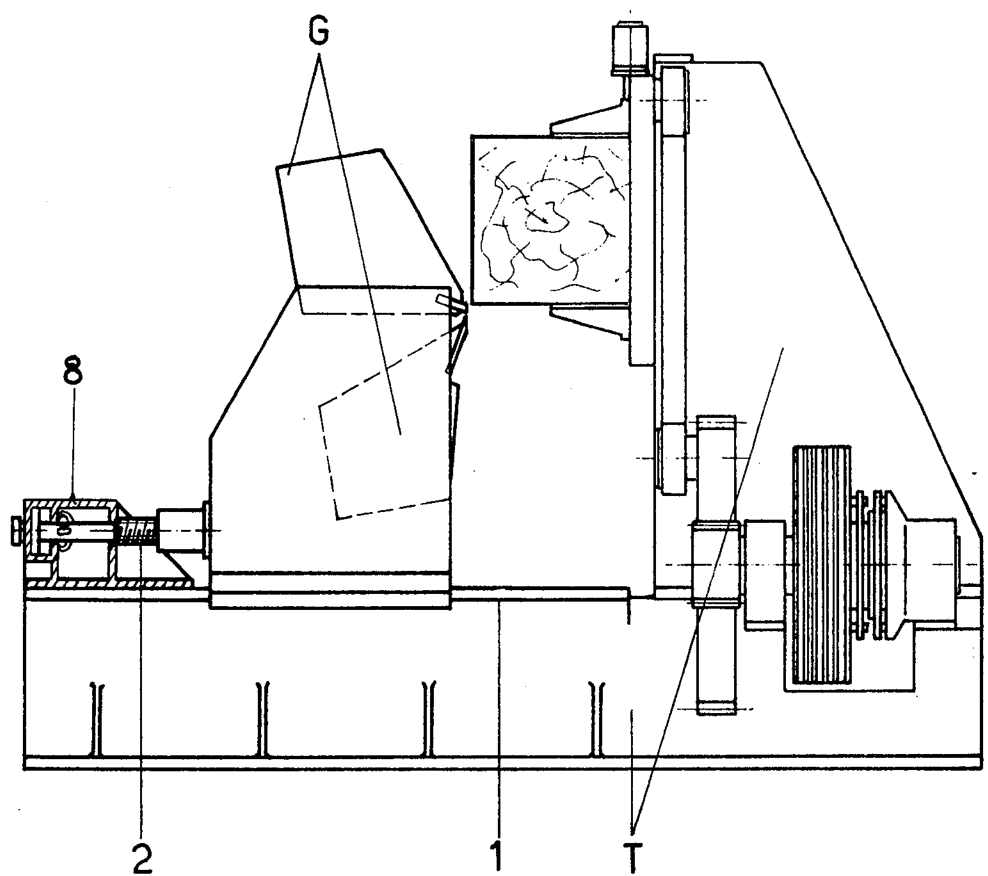
FIG. 1 shows the device in a partially sectioned side view, applied to a vertical wood shearing machine.
Figure 2:
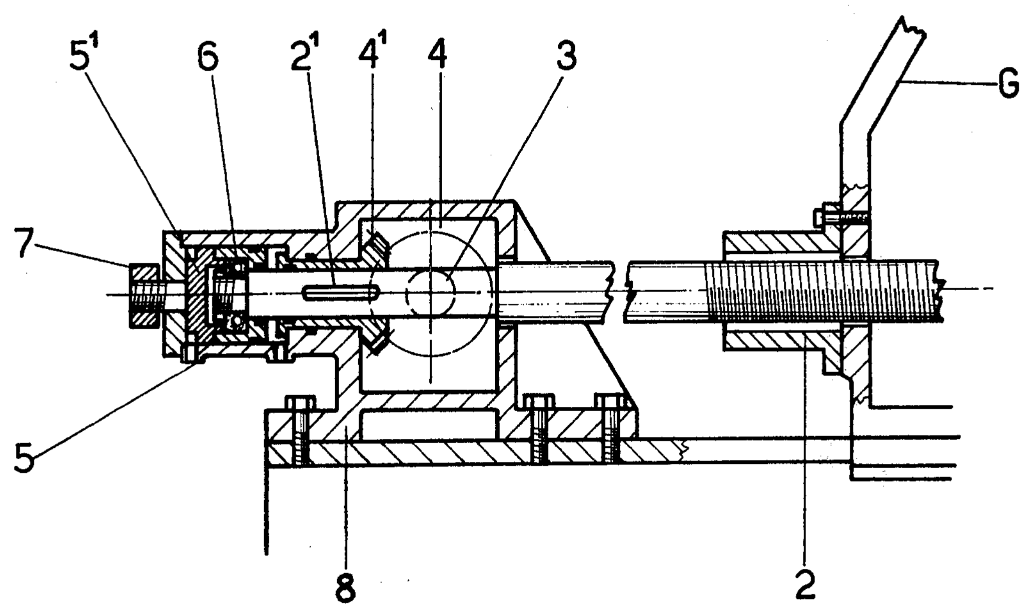
FIG. 2 shows the same on an enlarged scale, in vertical section.

As may be seen from the drawing, reference is made to a vertical wood shearing machine provided with a device for imparting the feeding motion to the bar-carrying unit and blade-holding unit and which includes two parallel screws.

However, the device applies also to wood shearing machines which are almost vertical, wherein the supporting surface for the wood stock is slightly inclined to the vertical. Moreover, said device, as a person skilled in the art will readily understand, may similarly be applied also to wood shearing machines provided with a device having four screws, instead of two, such as disclosed in another Patent Application Serial No. 686,680 filed on the same date, by the Applicant.

In the drawings, the wood shearing machine T is provided with an assembly G comprising the blade-holding unit and the bar-carrying unit, moving on guides 1, and which is suitable driven by means of screws 2. These screws are connected to each other by means of a shaft 3, with bevel gears 4, 4' for effecting the drive thereof. Each screw 2 is provided at one end with an hydraulic cylinder 5, integral with a rear reaction box 8 for effecting the rapid advance of the blade holding unit toward and away from a workpiece.

Cylinders 5 are double-acting whereby by alternately introducing fluid against the front or rear space of the relevant piston 5', it is possible to obtain a quick motion to-and-fro of screws 2 and consequently of assembly G.

Each screw 2 slides within a gear 4' but is restrained rotating by means of a key 2' and associated keyway or slat. Within the body of each piston 5' there is a thrust bearing 6 which axially restrains the respective screw 2 to said piston 5' while permitting rotation of screw 2 when piston 5' is stationary.

A nut7 serves to calibrate the axial stroke of each piston 5' and of the corresponding screw 2, as necessary. In practice, operation of the device according to the invention is therefore as follows;

a. every time the wood stock descends, cutting takes place thereon;

b. when the lower position of the wood stock is reached, assembly G starts quickly to move away from it while fluid is being introduced in the front portion of pistons 5';

c. while the wood stock moves up, screws 2 rotate and move assembly G close to the wood stock, by an amount equal to the thickness of the sheet to be successively cut;

d. when the wood stock has reached the upper dead center, assembly G starts quickly to move closer to the wood stock, while fluid is being introduced in the rear portion of pistons 5'. The quick displacements axially imparted to screws 2 and thus to assembly G by pistons 5', obviously have to be greater than the displacements derived as feeding by the sole rotation of screws 2.

Figure 3:
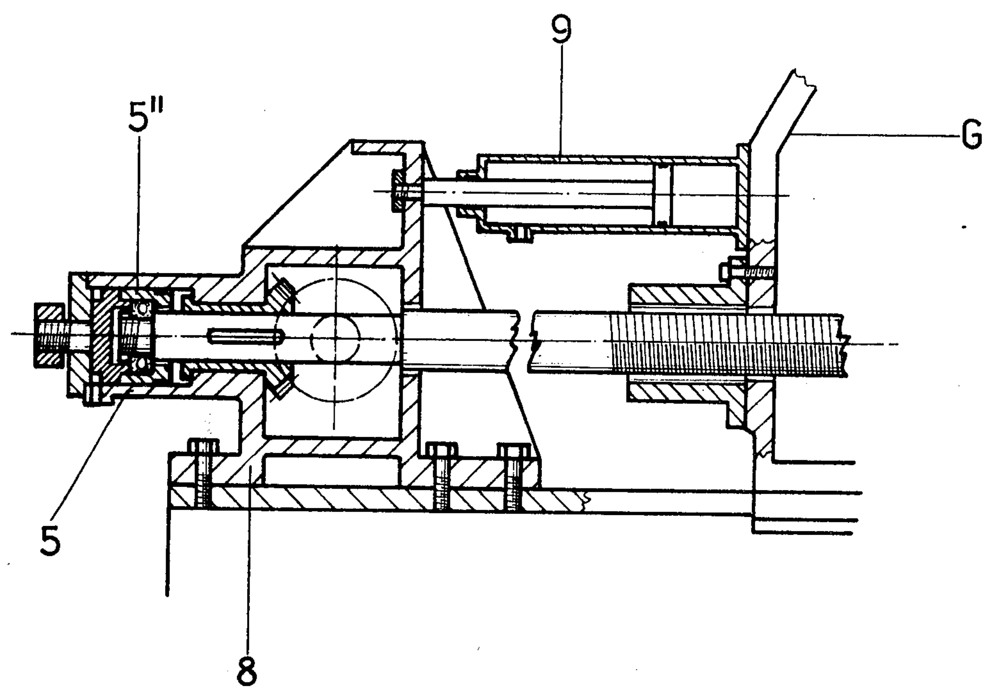
FIG. 3 is is similar to FIG. 2 and shows a variation.-

As mentioned above, FIG. 3 shows an alternative embodiment of the device. In this case, the hydraulic cylinders 5 with pistons 5'' are single-acting and are opposed to other cylinders 9 which are also single-acting, fixed at one side to assembly G and at the other side to the rear reaction boxes 8. In this case, it is possible to introduce alternatively the fluid against the rear portion of pistons 5'' and in the chamber with the rod of cylinders 9. When cylinders 5 and 9 are of the same dimensions what has been said above applies; however, when some of them have greater dimensions than others, the compressed fluid may be kept in the smaller cylinders and may be introduced in the suitable place in the bigger ones only when the direction of movement has to be changed.

I claim:

1. A shearing machine comprising a blade holding and bar carrying unit mounted for movement relative to a work piece for effecting a cutting operation on the work piece, a feed means for moving said unit relative to said work piece, said feed means including a feed screw connected to said unit, drive means connected to said feed screw to effect the rotation of said screw for determining the axial feeding motion of said unit during the cutting operation, and said feed means further including hydraulic actuating means connected to said feed screw for effecting a rapid retraction and advancement of said unit relative to said work piece between cutting operations.

2. The invention as defined in claim 1, wherein said actuating means includes a piston and cylinder assembly connected to said screw.

3. The invention as defined in claim 1, wherein said drive means includes a driving gear, said screw being slideably mounted relative to said driving gear, and means for keying said gear to said screw for effecting rotation of said screw when said gear is driven.

4. The invention as defined in claim 3 wherein said piston and cylinder assembly includes a double acting piston for effecting rapid linear movement of said screw toward and away from the workpiece.

5. The invention as defined in claim 4 and including means to adjust the axial stroke of said piston.

6. A shearing machine comprising a blade holding and a bar carrying unit, a feed device comprising at least one pair of feed screws, said feed device being connected to said unit, drive means for effecting the rotation of said screws to determine the axial feeding motion of said device during a cutting operation of a work piece, and a piston and cylnder assembly connected to each of the respective screws, whereby the axial displacement of the piston of said assemblies effects a rapid advancement and retraction of said unit toward and away from the work piece between cutting operations.

7. The invention as defined in claim 6 wherein the cylinder of said assemblies is disposed inaxial alignment with a corresponding screw, connecting means for connecting the piston of said assembly to its corresponding screw whereby said screw can rotate relative to said piston, and means for calibrating the stroke of said piston.

8. The invention as defined in claim 7 and wherein said connecting means includes a thrust bearing to axially restrain the respective screw to said piston while permitting rotation of said screw independently of said bearing.

9. The invention as defined in claim 6 wherein said drive means includes a driving gear, said screw being slideably disposed relative to said gear for relative longitudinal movement thereto, and means keying said screw to said gear whereby said gear and screw are rotated in unison.

10. The invention as defined in claim 6 wherein said piston and cylinder assembly are double acting.

11. The invention as defined in claim 6 wherein said piston and cylinder assemblies are single acting; and a second piston and cylinder assembly connected to said unit as to oppose said first mentioned piston and cylinder assembly.

12. The invention as defined in claim 11 wherein said first and second piston and cylinder assemblies have different sections so as to allow a differntial operation by keeping a constant fluid pressure in the cylinder of smaller section and supplying fluid intermitently to the cylinder having a larger section.

* * * * *